United States Patent
Kwon et al.

(10) Patent No.: US 9,852,018 B2
(45) Date of Patent: Dec. 26, 2017

(54) METHOD OF DETECTING AN ERROR OF A MULTI-TIME PROGRAMMABLE OPERATION, AND ORGANIC LIGHT EMITTING DISPLAY DEVICE EMPLOYING THE SAME

(71) Applicant: Samsung Display Co., Ltd., Yongin, Gyeonggi-Do (KR)

(72) Inventors: Myoung-Ho Kwon, Yongin (KR); Chang-Jin Lee, Yongin (KR); Chang-Kil Lee, Yongin (KR); Tae-Sik Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 146 days.

(21) Appl. No.: 13/955,091

(22) Filed: Jul. 31, 2013

(65) Prior Publication Data
US 2014/0189444 A1    Jul. 3, 2014

(30) Foreign Application Priority Data

Dec. 28, 2012 (KR) ........................ 10-2012-0156337

(51) Int. Cl.
*G06F 11/07* (2006.01)
*G09G 3/00* (2006.01)
*G09G 3/3208* (2016.01)
*G09G 5/06* (2006.01)

(52) U.S. Cl.
CPC ...... *G06F 11/0763* (2013.01); *G06F 11/0736* (2013.01); *G09G 3/006* (2013.01); *G09G 3/3208* (2013.01); *G09G 5/06* (2013.01); *G09G 2320/0276* (2013.01); *G09G 2330/12* (2013.01)

(58) Field of Classification Search
None
See application file for complete search history.

(56) References Cited

U.S. PATENT DOCUMENTS

2002/0024510 A1* 2/2002 Ozawa ................. G09G 3/3688
                                                                  345/204
2007/0040775 A1* 2/2007 Horisaki .......... G03G 15/04072
                                                                  345/82

(Continued)

FOREIGN PATENT DOCUMENTS

KR    10-2011-0023140    3/2011
KR    10-2011-0023141    3/2011

(Continued)

*Primary Examiner* — Liliana Cerullo
*Assistant Examiner* — Donna Lui
(74) *Attorney, Agent, or Firm* — H.C. Park & Associates, PLC

(57) ABSTRACT

A method of detecting an error of a multi-time programmable (MTP) operation in which each gamma-offset and each header-bit at predetermined reference gray-levels are written in a MTP memory device while the MTP operation is performed on a pixel circuit, the each header-bit indicating whether or not the each gamma-offset is written in the MTP memory device, and it is detected whether or not the MTP operation is performed on the pixel circuit based on a logical operation between the header-bits at the predetermined reference gray-levels read from the MTP memory device when the MTP operation is finished on the pixel circuit.

19 Claims, 10 Drawing Sheets

(56) References Cited

U.S. PATENT DOCUMENTS

| | | | |
|---|---|---|---|
| 2008/0291135 A1* | 11/2008 | Kim | G09G 3/2022 345/76 |
| 2009/0009498 A1* | 1/2009 | Nishimura | G09G 3/3688 345/205 |
| 2011/0025665 A1 | 2/2011 | Bae | |
| 2011/0141097 A1 | 6/2011 | Lee et al. | |
| 2012/0127807 A1* | 5/2012 | Pio | G11O 5/147 365/189.09 |
| 2012/0206971 A1* | 8/2012 | Chi | G11C 17/08 365/185.18 |

FOREIGN PATENT DOCUMENTS

| | | |
|---|---|---|
| KR | 10-1056433 | 8/2011 |
| KR | 10-1082168 | 11/2011 |

* cited by examiner

METHOD OF DETECTING AN ERROR OF A MULTI-TIME PROGRAMMABLE OPERATION, AND ORGANIC LIGHT EMITTING DISPLAY DEVICE EMPLOYING THE SAME

CLAIM PRIORITY

This application makes reference to, incorporates the same herein, and claims all benefits accruing under 35 U.S.C. §119 from an application earlier filed in the Korean Intellectual Property Office on 28 Dec. 2012 and there duly assigned Serial No. 10-2012-0156337.

BACKGROUND OF THE INVENTION

1. Field of the Invention

Example embodiments relate generally to a display device.

2. Description of the Related Art

Recently, an organic light emitting display device is widely used as a flat panel display device. As the organic light emitting display device is manufactured, an image quality of an end product (i.e., complete product) of the organic light emitting display device may not reach a target quality level because of deviations in a manufacturing process. In this case, the end product may be determined as a defective product, and the defective product may be discarded. However, discarding all end products determined as defective products is not efficient. That is, a post-correction for adjusting the image quality of the organic light emitting display device to reach the target quality level is required.

The above information disclosed in this Related Art section is only for enhancement of understanding of the background of the invention and therefore it may contain information that does not form the prior art that is already known to a person of ordinary skill in the art.

SUMMARY OF THE INVENTION

Some example embodiments provide a method of detecting an error of a multi-time programmable (MTP) operation capable of accurately detecting whether or not the MTP operation is performed on a pixel circuit in an organic light emitting display device.

Some example embodiments provide a method of detecting an error of an MTP operation capable of accurately detecting whether or not gamma-offsets are correctly written in an MTP memory device for a pixel circuit when the MTP operation is performed on the pixel circuit in an organic light emitting display device.

Some example embodiments provide an organic light emitting display device employing the method of detecting an error of an MTP operation.

According to some example embodiments, a method of detecting an error of a multi-time programmable (MTP) operation may include a step of writing each gamma-offset and each header-bit at predetermined reference gray-levels in an MTP memory device while the MTP operation is performed on a pixel circuit, the each header-bit indicating whether or not the each gamma-offset is written in the MTP memory device, and a step of detecting whether or not the MTP operation is performed on the pixel circuit based on a logical operation between the header-bits at the predetermined reference gray-levels read from the MTP memory device when the MTP operation is finished on the pixel circuit.

In example embodiments, the pixel circuit may include a red color pixel circuit, a green color pixel circuit, and a blue color pixel circuit.

In example embodiments, the pixel circuit may further include a white color pixel circuit.

In example embodiments, the step of writing the each gamma-offset and the each header-bit at the predetermined reference gray-levels in the MTP memory device may include a step of setting the each header-bit to have a first logic level when the each gamma-offset is written in the MTP memory device, and a step of setting the each header-bit to have a second logic level when the each gamma-offset is not written in the MTP memory device.

In example embodiments, the step of detecting whether or not the MTP operation is performed on the pixel circuit may include a step of determining that the MTP operation is not performed when at least one of the header-bits read from the MTP memory device has the second logic level, and a step of determining that the MTP operation is performed when all of the header-bits read from the MTP memory device has the first logic level.

In example embodiments, the first logic level may correspond to a binary number '1', and the second logic level may correspond to a binary number '0'.

In example embodiments, an AND-gate circuit may output a result-bit by performing an AND-operation between the header-bits read from the MTP memory device. Here, a detecting result may be that the MTP operation is performed on the pixel circuit when the result-bit has the binary number '0', and the detecting result may be that the MTP operation is not performed when the result-bit has the binary number '1'.

According to some example embodiments, a method of detecting an error of a multi-time programmable (MTP) operation may include a step of updating each gamma-offset and each header-bit at predetermined reference gray-levels in an MTP buffer device while the MTP operation is performed on a pixel circuit, the each header-bit indicating whether or not the each gamma-offset is written in the MTP buffer device, a step of writing each finally updated gamma-offset and each finally updated header-bit at the predetermined reference gray-levels in an MTP memory device when the MTP operation is finished on the pixel circuit, and a step of detecting whether or not the each gamma-offset is correctly written in the MTP memory device based on a logical operation between each bit of the each gamma-offset written in the MTP buffer device and each bit of the each finally updated gamma-offset written in the MTP memory device.

In example embodiments, the pixel circuit may include a red color pixel circuit, a green color pixel circuit, and a blue color pixel circuit.

In example embodiments, the pixel circuit may further include a white color pixel circuit.

In example embodiments, the step of detecting whether or not the each gamma-offset is correctly written in the MTP memory device may include a step of determining that the each gamma-offset is correctly written in the MTP memory device when the each bit of the each gamma-offset written in the MTP buffer device is identical to the each bit of the each finally updated gamma-offset written in the MTP memory device, and a step of determining that the each gamma-offset is incorrectly written in the MTP memory device when the each bit of the each gamma-offset written in the MTP buffer device is not identical to the each bit of the each finally updated gamma-offset written in the MTP memory device.

In example embodiments, XOR-gate circuits may output first result-bits by performing an XOR-operation between the each bit of the each gamma-offset written in the MTP buffer device and the each bit of the each finally updated gamma-offset written in the MTP memory device, and an OR-gate circuit may output a second result-bit by performing an OR-operation between the first result-bits. Here, a detecting result may be that the each gamma-offset is incorrectly written in the MTP memory device when the second result-bit has a binary number '1', and the detecting result may be that the each gamma-offset is correctly written in the MTP memory device when the second result-bit has a binary number '0'.

According to some example embodiments, an organic light emitting display device may include a display panel having a plurality of pixel circuits, a scan driving unit that provides a scan signal to the pixel circuits, a data driving unit that provides a data signal to the pixel circuits, a power unit that provides a high power voltage and a low power voltage to the pixel circuits, a multi-time programmable (MTP) processing unit that adjusts the data signal based on gamma-offsets for pixel circuits, where the gamma-offsets are generated by performing an MTP operation at predetermined reference gray-levels for the pixel circuits, and that detects an error of the MTP operation based on the gamma-offsets and header-bits indicating whether or not the gamma-offsets are written, and a timing control unit that controls the scan driving unit, the data driving unit, the power unit, and the MTP processing unit.

In example embodiments, the MTP processing unit may be located within the data driving unit or within the timing control unit.

In example embodiments, the pixel circuits may include red color pixel circuits, green color pixel circuits, and blue color pixel circuits.

In example embodiments, the pixel circuits may further include white color pixel circuits.

In example embodiments, the MTP processing unit may include an MTP buffer device that updates the gamma-offsets and the header-bits while the MTP operation is performed on the pixel circuits, an MTP memory device that receives finally updated gamma-offsets and finally updated header-bits from the MTP buffer device, and that stores the finally updated gamma-offsets and the finally updated header-bits when the MTP operation is finished on the pixel circuits, a data signal adjusting device that adjusts the data signal based on the finally updated gamma-offsets that are stored in the MTP memory device, and an error detecting device that detects the error of the MTP operation based on at least one of the gamma-offsets, the finally updated gamma-offsets, the header-bits, and the finally updated header-bits.

In example embodiments, the header-bits may be set to have a first logic level when the gamma-offsets are written in the MTP memory device, and the header-bits may be set to have a second logic level when the gamma-offsets are not written in the MTP memory device.

In example embodiments, the error detecting device may determine that the MTP operation is not performed when at least one of the header-bits read from the MTP memory device has the second logic level.

In example embodiments, the error detecting device may determine that the MTP operation is performed when all of the header-bits read from the MTP memory device have the first logic level.

In example embodiments, the error detecting device may determine that the gamma-offsets are correctly written in the MTP memory device when each bit of the gamma-offsets written in the MTP buffer device is identical to each bit of the finally updated gamma-offsets written in the MTP memory device.

In example embodiments, the error detecting device may determine that the gamma-offsets are incorrectly written in the MTP memory device when the each bit of the gamma-offsets written in the MTP buffer device is not identical to the each bit of the finally updated gamma-offsets written in the MTP memory device.

Therefore, a method of detecting an error of an MTP operation according to example embodiments may accurately detect whether or not the MTP operation is performed on a pixel circuit based on a logical operation between header-bits read from an MTP memory device in an organic light emitting display device.

In addition, a method of detecting an error of an MTP operation according to example embodiments may accurately detect whether or not gamma-offsets are correctly written in an MTP memory device for a pixel circuit based on a logical operation between each bit of gamma-offsets written in an MTP buffer device and each bit of finally updated gamma-offsets written in the MTP memory device when the MTP operation is performed on the pixel circuit in an organic light emitting display device.

Further, an organic light emitting display device according to example embodiments may reduce determination errors (e.g., an error that a non-defective product is determined as a defective product, and an error that a defective product is determined as a non-defective product) by employing the method of detecting an error of an MTP operation.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE EMBODIMENTS

Figure 1:
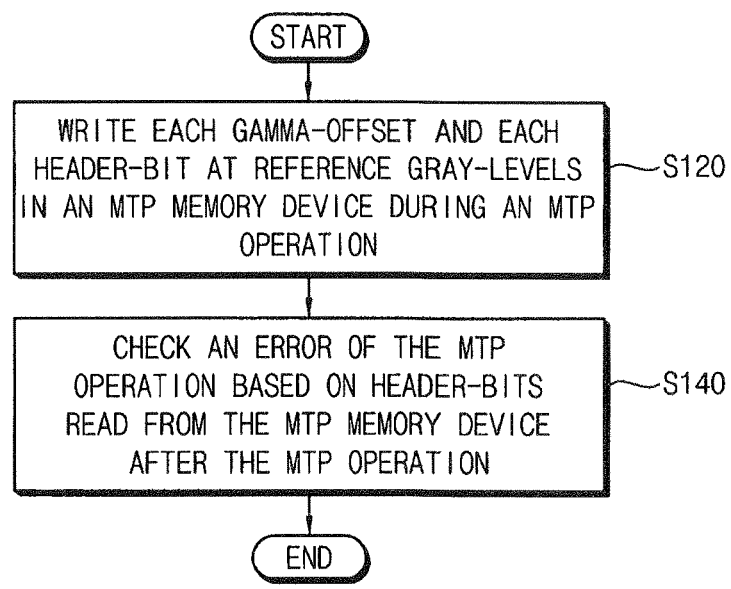
FIG. 1 is a flow chart illustrating a method of detecting an error of a multi-time programmable (MTP) operation according to example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A multi-time programmable (MTP) operation for repeatedly performing a post-correction in luminance and color coordinate for respective pixel circuits is performed in order to adjust the image quality of the organic light emitting display device to reach the target quality level. However, an error of the MTP operation may occur (e.g., the MTP operation may be omitted on specific pixel circuits, or respective gamma-offsets may be incorrectly written in an MTP memory device for respective pixel circuits). As a result, a non-defective product may be determined as a defective product, or a defective product may be determined as a non-defective product. Conventionally, since an inspector performs an eye-detection to detect the error of the MTP operation, the error of the MTP operation may be detected inaccurately.

Figure 2:
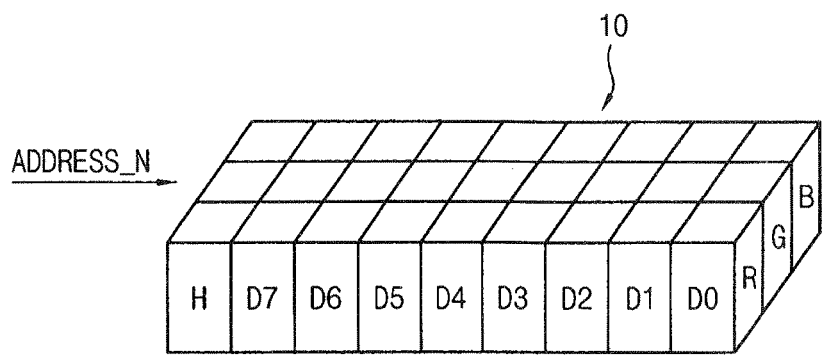
FIG. 2 is a diagram illustrating gamma-offsets and header-bits that are written in an MTP memory device when a method of FIG. 1 is performed.

FIG. 1 is a flow chart illustrating a method of detecting an error of a multi-time programmable (MTP) operation according to example embodiments. FIG. 2 is a diagram illustrating gamma-offsets and header-bits that are written in an MTP memory device when a method of FIG. 1 is performed.

Referring to FIGS. 1 and 2, the method of FIG. 1 may write each gamma-offset (i.e., indicated as D0 through D7) and each header-bit (i.e., indicated as H) at predetermined reference gray-levels in an MTP memory device 10 (Step S120) while an MTP operation is performed on a pixel circuit. Here, each header-bit indicates whether or not each gamma-offset is written in the MTP memory device 10. Subsequently, the method of FIG. 1 may check whether or not the MTP operation is performed (or, is left out) on the pixel circuit based on a logical operation between header-bits read from the MTP memory device 10 (Step S140).

Generally, an MTP operation for repeatedly performing a post-correction in luminance and color coordinate for respective pixel circuits of a display panel of an organic light emitting display device is performed in order to adjust an image quality of the organic light emitting display device to reach a target quality level (see for example paragraph 0007 of US 2011/0025665 to Bae, now U.S. Pat. No. 8,493,375). As illustrated in FIG. 2, the method of FIG. 1 may write each header-bit (i.e., indicated as H) as well as each gamma-offset (i.e., indicated as D0 through D7) at the predetermined reference gray-levels (e.g., 16 gray-level, 35 gray-level, 255 gray-level) in the MTP memory device 10 while the MTP operation is performed on the pixel circuit. Since the MTP operation is repeatedly performed on the pixel circuit, each gamma-offset and each header-bit may be repeatedly written in the MTP memory device 10. Thus, an address ADDRESS_N may substantially correspond to the number of times the MTP operation is repeatedly performed on the pixel circuit. For this reason, the address ADDRESS_N may also correspond to a storage location in the MTP memory device 10.

As described above, the MTP operation is performed on the respective pixel circuits of the display panel of the organic light emitting display device. In one example embodiment, the pixel circuits may include red color pixel circuits (i.e., pixel circuits emitting a red color light), green color pixel circuits (i.e., pixel circuits emitting a green color pixel circuits), and blue color pixel circuits (i.e., pixel circuits emitting a blue color light). In this case, as illustrated in FIG. 2, the method of FIG. 1 may write each header-bit and each gamma-offset at the predetermined reference gray-levels in the MTP memory device 10 for respective red color pixel circuits, may write each header-bit and each gamma-offset at the predetermined reference gray-levels in the MTP memory device 10 for respective green color pixel circuits, and may write each header-bit and each gamma-offset at the predetermined reference gray-levels in the MTP memory device 10 for respective blue color pixel circuits. In another example embodiment, the pixel circuits may include red color pixel circuits (i.e., pixel circuits emitting a red color light), green color pixel circuits (i.e., pixel circuits emitting a green color pixel circuits), blue color pixel circuits (i.e., pixel circuits emitting a blue color light), and white color pixel circuits (i.e., pixel circuits emitting a white color light). In this case, the method of FIG. 1 may write each header-bit and each gamma-offset at the predetermined reference gray-levels in the MTP memory device 10 for respective red color pixel circuits, may write each header-bit and each gamma-offset at the predetermined reference gray-levels in the MTP memory device 10 for respective green color pixel circuits, may write each header-bit and each gamma-offset at the predetermined reference gray-levels in the MTP memory device 10 for respective blue color pixel circuits, and may write each header-bit and each gamma-offset at the predetermined reference gray-levels in the MTP memory device 10 for respective white color pixel circuits.

As described above, the method of FIG. 1 may write each gamma-offset and each header-bit at the predetermined reference gray-levels in the MTP memory device 10 while the MTP operation is performed on the pixel circuit. Here, at the predetermined reference gray-levels, when each gamma-offset (i.e., indicated as D0 through D7) is written in the MTP memory device 10, each header-bit (i.e., indicated as H) may be set to have a first logic level (e.g., a binary number '1'). On the other hand, at the predetermined reference gray-levels, when each gamma-offset (i.e., indicated as D0 through D7) is not written in the MTP memory device 10, each header-bit (i.e., indicated as H) may be set to have a second logic level (e.g., a binary number '0'). When the MTP operation is finished on the pixel circuit, the method of FIG. 1 may check whether the MTP operation is performed on the pixel circuit based on a logical operation between the header-bits read from the MTP memory device 10. Here, when at least one of the header-bits read from the MTP memory device 10 has the second logic level, the method of FIG. 1 may determine that the MTP operation is not performed on the pixel circuit. On the other hand, when all of the header-bits read from the MTP memory device 10 have the first logic level, the method of FIG. 1 may determine that the MTP operation has been performed on the pixel circuit.

In one example embodiment, the first logic level may correspond to a binary number '1', and the second logic level may correspond to a binary number '0'. In this case, the method of FIG. 1 may use an AND-gate circuit to perform an AND-operation between the header-bits read from the MTP memory device 10. Specifically, the AND-gate circuit generates a result-bit by performing an AND-operation between the header-bits read from the MTP memory device 10. Here, when the result-bit has a binary number '0', the method of FIG. 1 may determine that the MTP operation has not been performed on the pixel circuit. On the other hand, when the result-bit has a binary number '1', the method of FIG. 1 may determine that the MTP operation has been performed on the pixel circuit. This operation will be described below with reference to FIGS. 3 and 4. However, a way of performing a logical operation between the header-bits read from the MTP memory device 10 is not limited thereto.

In conclusion, the method of FIG. 1 may accurately detect whether or not the MTP operation is performed on the pixel circuit based on a logical operation between the header-bits read from the MTP memory device 10 when the MTP operation has finished on the pixel circuit. Conventionally, since an inspector performs an eye-detection to detect an error of the MTP operation, the error of the MTP operation may be detected inaccurately. As a result, since an error of the MTP operation occurs (e.g., the MTP operation may be omitted on specific pixel circuits, or respective gamma-offsets may be incorrectly written in the MTP memory device for the respective pixel circuits), a non-defective product may be determined as a defective product, or a defective product may be determined as a non-defective product. To overcome this problem, the method of FIG. 1 may write each header-bit (i.e., indicated as H) as well as each gamma-offset (i.e., indicated as D0 through D7) at the predetermined reference gray-levels in the MTP memory device 10 while the MTP operation is performed on the pixel circuit, and then may detect whether the MTP operation is performed on the pixel circuit based on a logical operation between the header-bits read from the MTP memory device 10 upon the MTP operation being completed on the pixel circuit. Therefore, the method of FIG. 1 may accurately detect the error of the MTP operation compared to conventional methods.

Figure 3:
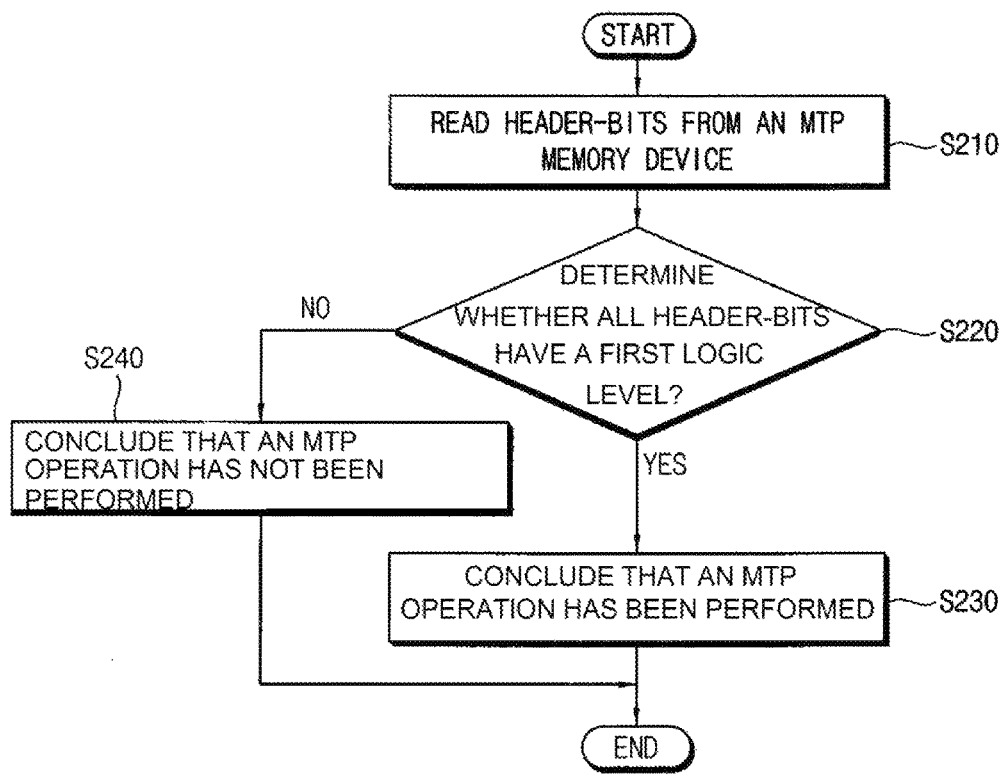
FIG. 3 is a flow chart illustrating an example in which a method of FIG. 1 detects whether or not an MTP operation is performed on a pixel circuit.
Figure 4:
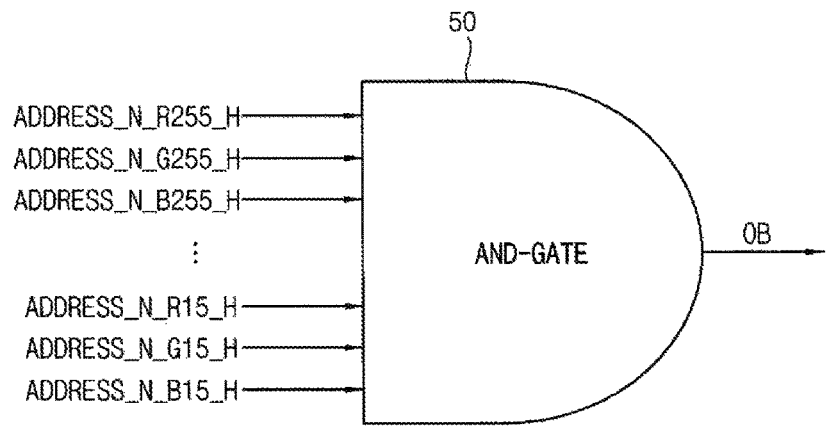
FIG. 4 is a block diagram illustrating an example in which a method of FIG. 1 detects whether or not an MTP operation is performed on a pixel circuit.

FIG. 3 is a flow chart illustrating an example in which a method of FIG. 1 detects whether an MTP operation is performed on a pixel circuit. FIG. 4 is a block diagram illustrating an example in which a method of FIG. 1 detects whether an MTP operation has been performed on a pixel circuit.

Referring to FIGS. 3 and 4, the method of FIG. 1 may read header-bits (i.e., the header-bits of predetermined reference gray-levels) from an MTP memory device 10 (Step S210), and then may check whether all of the header-bits read from the MTP memory device 10 have a first logic level (Step S220). Here, the method of FIG. 1 may determine that an MTP operation has been performed on a pixel circuit (Step S230) when all of the header-bits read from the MTP memory device 10 have a first logic level. On the other hand, the method of FIG. 1 may determine that the MTP operation has not been performed (i.e., the MTP operation is left out) on the pixel circuit (Step S240) when at least one of the header-bits read from the MTP memory device 10 has a second logic level.

It is assumed in FIG. 4 that the pixel circuits include red color pixel circuits, green color pixel circuits, and blue color pixel circuits. In addition, each gamma-offset and each header-bit of the predetermined reference gray-levels (e.g., 15 gray-level, 255 gray-level, etc) are written in the MTP memory device 10 for the red color pixel circuit, the green color pixel circuit, and the blue color pixel circuit. As described above, each header-bit indicates whether or not each gamma-offset has been written to the MTP memory device 10. As illustrated in FIG. 4, the method of FIG. 1 may check whether or not the MTP operation has been performed on the red color pixel circuit, the green color pixel circuit, and the blue color pixel circuit based on a logical operation between the header-bits (i.e., the header-bits of the predetermined reference gray-levels) read from the MTP memory device. It is illustrated in FIG. 4 that whether the MTP operation has been performed on the red color pixel circuit, the green color pixel circuit, and the blue color pixel circuit is simultaneously checked. However, the present inventive concept is not limited thereto. In one example embodiment, the method of FIG. 1 may use an AND-gate circuit 50 to perform an AND-operation between the header-bits read from the MTP memory device 10. Here, at the predetermined reference gray-levels, when each gamma-offset is written to the MTP memory device 10, each header-bit may be set to have a first logic level (e.g., a binary number '1'). On the other hand, at the predetermined reference gray-levels, when each gamma-offset has not been written to the MTP memory device 10, each header-bit may be set to have a second logic level (e.g., a binary number '0').

Specifically, the AND-gate circuit 50 may receive the header-bits of the predetermined reference gray-levels from the MTP memory device 10 for the red color pixel circuit, the green color pixel circuit, and the blue color pixel circuit. For example, the AND-gate circuit 50 may receive a header-bit of the 15 gray-level for the red color pixel circuit (i.e., indicated as ADDRESS_N_R15_H), a header-bit of the 15 gray-level for the green color pixel circuit (i.e., indicated as ADDRESS_N_G15_H), and a header-bit of the 15 gray-level for the blue color pixel circuit (i.e., indicated as ADDRESS_N_B15_H), and may receive a header-bit of the 255 gray-level for the red color pixel circuit (i.e., indicated as ADDRESS_N_R255_H), a header-bit of the 255 gray-level for the green color pixel circuit (i.e., indicated as ADDRESS_N_G255_H), and a header-bit of the 255 gray-level for the blue color pixel circuit (i.e., indicated as ADDRESS_N_B255_H). Thus, the AND-gate circuit 50 may generate (i.e., output) a result-bit OB by performing an AND-operation between the header-bits of the predetermined reference gray-levels read from the MTP memory device 10. As a result, the method of FIG. 1 may determine that the MTP operation has not been performed on the red color pixel circuit, the green color pixel circuit, and the blue color pixel circuit when the result-bit OB has a binary number '0'. On the other hand, the method of FIG. 1 may determine that the MTP operation has been performed on the red color pixel circuit, the green color pixel circuit, and the blue color pixel circuit when the result-bit OB has a binary number '1'. However, a way of performing a logical operation between the header-bits read from the MTP memory device 10 is not limited thereto. In conclusion, the method of FIG. 1 may accurately detect whether or not the MTP operation has been performed on the pixel circuit based on a logical operation between the header-bits read from the MTP memory device 10 when the MTP operation has concluded on the pixel circuit.

Figure 5:
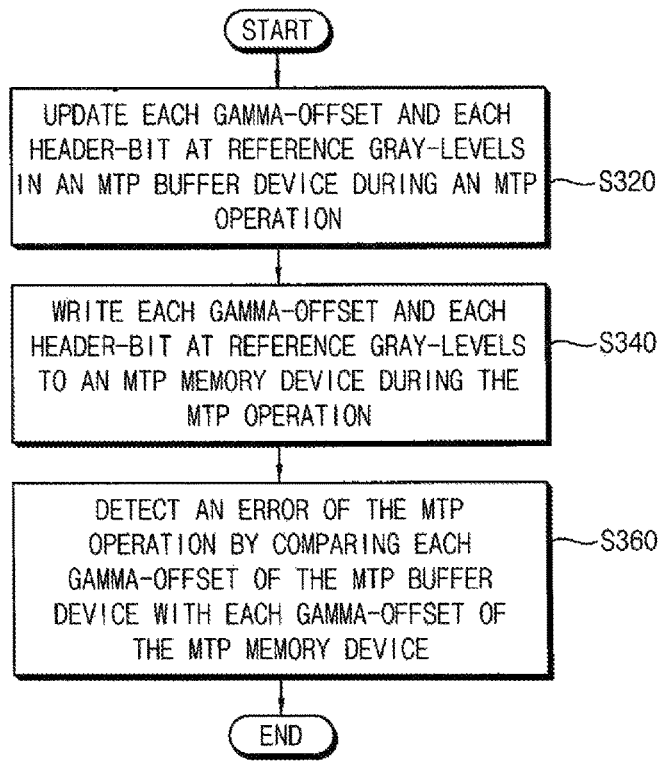
FIG. 5 is a flow chart illustrating a method of detecting an error of an MTP operation according to example embodiments.

FIG. 5 is a flow chart illustrating a method of detecting an error of an MTP operation according to example embodiments.

Referring to FIG. 5, the method of FIG. 5 may update each gamma-offset and each header-bit at predetermined reference gray-levels in an MTP buffer device while an MTP operation is being performed on a pixel circuit (Step S320). Here, each header-bit indicates whether or not each gamma-offset has been written to the MTP buffer device. Near the end of the MTP operation, the method of FIG. 5 may write each finally updated gamma-offset and each finally updated header-bit at the predetermined reference gray-levels to the MTP memory device (Step S340). As a result of the MTP operation, each finally updated gamma-offset and each finally updated header-bit should have been written in the MTP memory device. However, due to the possibility of errors in the MTP operation, the process of FIG. 5 continues by detecting whether each gamma-offset has been correctly written to the MTP memory device for the pixel circuit based on a logical operation between each bit of each gamma-offset written in the MTP buffer device and each bit of each finally updated gamma-offset written to the MTP memory device (Step S360).

As described above, an MTP operation for repeatedly performing a post-correction in luminance and color coordinate for respective pixel circuits of a display panel of an organic light emitting display device is performed in order to adjust an image quality of the organic light emitting display device to reach a target quality level. In one example embodiment, the pixel circuits may include red color pixel circuits, green color pixel circuits, and blue color pixel circuits. In this case, the method of FIG. 5 may write each header-bit and each gamma-offset at the predetermined reference gray-levels in the MTP memory device for respective red color pixel circuits, may write each header-bit and each gamma-offset at the predetermined reference gray-levels in the MTP memory device for respective green color pixel circuits, and may write each header-bit and each gamma-offset at the predetermined reference gray-levels in the MTP memory device for respective blue color pixel circuits. In another example embodiment, the pixel circuits may include red color pixel circuits, green color pixel circuits, blue color pixel circuits, and white color pixel circuits. In this case, the method of FIG. 5 may write each header-bit and each gamma-offset at the predetermined reference gray-levels in the MTP memory device for respective red color pixel circuits, may write each header-bit and each gamma-offset at the predetermined reference gray-levels in the MTP memory device for respective green color pixel circuits, may write each header-bit and each gamma-offset at the predetermined reference gray-levels in the MTP memory device for respective blue color pixel circuits, and may write each header-bit and each gamma-offset at the predetermined reference gray-levels in the MTP memory device for respective white color pixel circuits.

Here, each gamma-offset and each header-bit may be updated at the predetermined reference gray-levels in the MTP buffer device, and then each finally updated gamma-offset and each finally updated header-bit may be written at the predetermined reference gray-levels in the MTP memory device. However, an error may occur when each gamma-offset is transmitted from the MTP buffer device to the MTP memory device. As a result, each gamma-offset written in the MTP buffer device may be different from each gamma-offset written in the MTP memory device. Thus, the method of FIG. 5 may update each gamma-offset and each header-bit at the predetermined reference gray-levels in the MTP buffer device while the MTP operation is being performed on the pixel circuit, and then may write each finally updated gamma-offset and each finally updated header-bit at the predetermined reference gray-levels in the MTP memory device. Next, the method of FIG. 5 may detect whether each gamma-offset is correctly written in the MTP memory device for the pixel circuit based on a logical operation between each bit of each gamma-offset written in the MTP buffer device and each bit of each finally updated gamma-offset written in the MTP memory device. Here, the method of FIG. 5 may determine that each gamma-offset is correctly written in the MTP memory device for the pixel circuit when each bit of each gamma-offset written in the MTP buffer device is identical to each bit of each finally updated gamma-offset written in the MTP memory device. On the other hand, the method of FIG. 5 may determine that each gamma-offset is incorrectly written in the MTP memory device for the pixel circuit when each bit of each gamma-offset written in the MTP buffer device is not identical to each bit of each finally updated gamma-offset written in the MTP memory device.

In one example embodiment, the method of FIG. 5 may use XOR-gate circuits and an OR-gate circuit when performing a logical operation between each bit of each gamma-offset written in the MTP buffer device and each bit of each finally updated gamma-offset written in the MTP memory device. For example, a quantity of the XOR-gate circuits may correspond to a quantity of bits of each gamma offset. Specifically, as the XOR-gate circuits perform an XOR-operation between each bit of each gamma-offset written in the MTP buffer device and each bit of each finally updated gamma-offset written in the MTP memory device, the XOR-gate circuits may output first result-bits. In addition, as the OR-gate circuit performs an OR-operation between the first result-bits, the OR-gate circuit may output a second result-bit. Here, the method of FIG. 5 may determine that each gamma-offset is incorrectly written in the MTP memory device for the pixel circuit when the second result-bit has a binary number '1'. On the other hand, the method of FIG. 5 may determine that each gamma-offset is correctly written in the MTP memory device for the pixel circuit when the second result-bit has a binary number '0'. This operation will be described below with reference to FIGS. 6 and 7. However, a way of performing a logical operation between the gamma-offsets read from the MTP buffer device and the MTP memory device is not limited thereto.

In conclusion, the method of FIG. 5 may accurately detect whether or not each gamma-offset is correctly written in the MTP memory device based on a logical operation between each bit of each gamma-offset written in the MTP buffer device and each bit of each finally updated gamma-offset written in the MTP memory device. Conventionally, since an inspector performs an eye-detection to detect an error of the MTP operation, the error of the MTP operation may be detected inaccurately. As a result, since an error of the MTP operation occurs (e.g., the MTP operation may be omitted on specific pixel circuits, or respective gamma-offsets may be incorrectly written in the MTP memory device for respective pixel circuits), a non-defective product may be determined as a defective product, or a defective product may be determined as a non-defective product. To overcome this problem, the method of FIG. 5 may update each gamma-offset at the predetermined reference gray-levels in the MTP buffer device, may write each finally updated gamma-offset at the predetermined reference gray-levels in the MTP memory device while the MTP operation is performed on the pixel circuit, and then may detect whether or not each gamma-offset is correctly written in the MTP memory device based on a logical operation between each bit of each gamma-offset written in the MTP buffer device and each bit of each finally updated gamma-offset written in the MTP memory device. Therefore, the method of FIG. 5 may accurately detect the error of the MTP operation compared to conventional methods.

Figure 6:
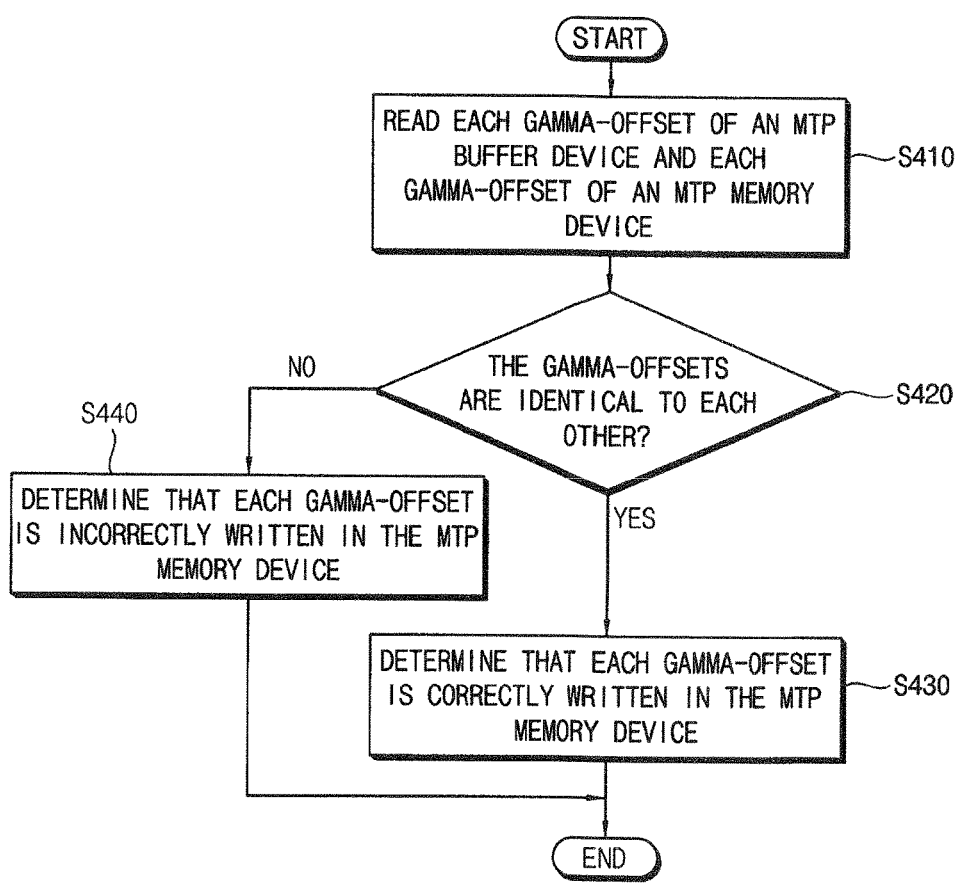
FIG. 6 is a flow chart illustrating an example in which a method of FIG. 5 detects whether or not gamma-offsets are correctly written in an MTP memory device.
Figure 7:
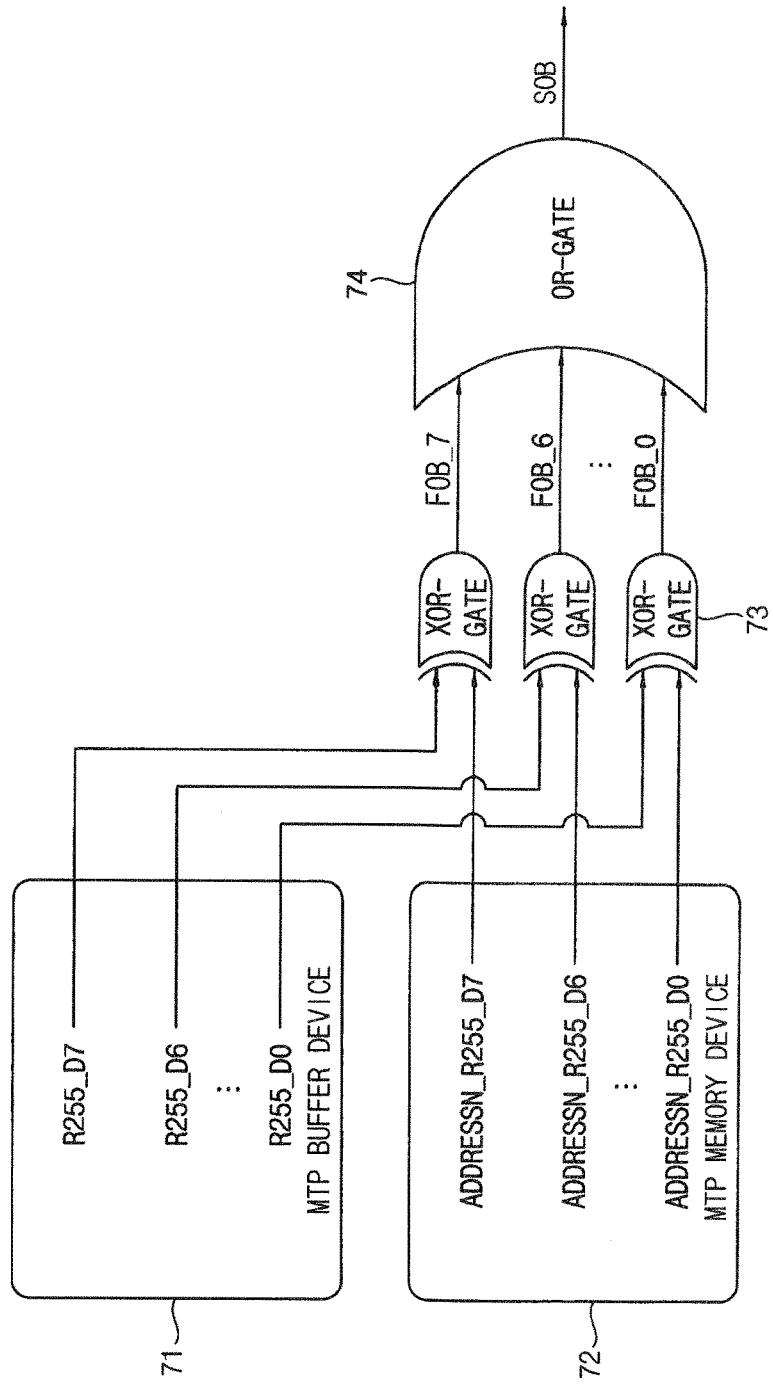
FIG. 7 is a block diagram illustrating an example in which a method of FIG. 5 detects whether or not gamma-offsets are correctly written in an MTP memory device.

FIG. 6 is a flow chart illustrating an example in which a method of FIG. 5 detects whether gamma-offsets are correctly written in an MTP memory device. FIG. 7 is a block diagram illustrating an example in which a method of FIG. 5 detects whether gamma-offsets are correctly written in an MTP memory device.

Referring to FIGS. 6 and 7, the method of FIG. 5 may read each gamma-offset at predetermined reference gray-levels from an MTP buffer device 71 and each gamma-offset (i.e., each finally updated gamma-offset) at the predetermined reference gray-levels from an MTP memory device 72 (Step S410), and then may check whether each gamma-offset written in the MTP buffer device 71 is identical to each gamma-offset written in the MTP memory device 72 (Step S420). Here, the method of FIG. 5 may determine that each gamma-offset is correctly written in the MTP memory device 72 (Step S430) when each gamma-offset written in the MTP buffer device 71 is identical to each gamma-offset written in the MTP memory device 72. On the other hand, the method of FIG. 5 may determine that each gamma-offset is incorrectly written in the MTP memory device 72 (Step S440) when each gamma-offset written in the MTP buffer device 71 is not identical to each gamma-offset written in the MTP memory device 72. It is illustrated in FIG. 7 that the method of FIG. 5 performs a gamma-offset checking operation at one (i.e., 255 gray-level) of the predetermined reference gray-levels.

In one example embodiment, as illustrated in FIG. 7, the method of FIG. 5 may use XOR-gate circuits 73 and an OR-gate circuit 74 to perform a logical operation between each bit R255_D0 through R255_D7 of each gamma-offset written in the MTP buffer device 71 and each bit ADDRESSN_R255_D0 through ADDRESSN_R255_D7 of each gamma-offset written in the MTP memory device 72. Here, a quantity of the XOR-gate circuits 73 may correspond to a quantity of bits of each gamma-offset (e.g., a quantity of bits of each gamma-offset is 8 in FIG. 7). Specifically, the XOR-gate circuits 73 may output first result-bits FOB_0 through FOB_7, respectively by performing an XOR-operation between each bit R255_D0 through R255_D7 of each gamma-offset written in the MTP buffer device 71 and each bit ADDRESSN_R255_D0 through ADDRESSN_R255_D7 of each gamma-offset written in the MTP memory device 72. Next, the OR-gate circuit 74 may output a second result-bit SOB by performing an OR-operation between the first result-bits FOB_0 through FOB_7. Thus, the method of FIG. 5 may determine that each gamma-offset is incorrectly written in the MTP memory device 72 for the pixel circuit when the second result-bit SOB has a binary number '1'. On the other hand, the method of FIG. 5 may determine that each gamma-offset is correctly written in the MTP memory device 72 for the pixel circuit when the second result-bit SOB has a binary number '0'.

For example, in FIG. 7, the XOR-gate circuits 73 may output the first result-bits FOB_x, respectively as shown Table 1 below.

TABLE 1

| R255_Dx | ADDRESS_N_R255_Dx | FOB_x | RESULT |
| --- | --- | --- | --- |
| 0 | 0 | 0 | OK |
| 0 | 1 | 1 | ERROR |
| 1 | 0 | 1 | ERROR |
| 1 | 1 | 0 | OK |

As shown in Table 1, the XOR-gate circuits 73 may output a binary number '0' as the first result-bits FOB_x, respectively when each bit R255_Dx of each gamma-offset written in the MTP buffer device 71 is identical to each bit ADDRESSN_R255_Dx of each gamma-offset written in the MTP memory device 72. On the other hand, the XOR-gate circuits 73 may output a binary number '1' as the first result-bits FOB_x, respectively when each bit R255_Dx of each gamma-offset written in the MTP buffer device 71 is not identical to each bit ADDRESSN_R255_Dx of each gamma-offset written in the MTP memory device 72. Subsequently, the OR-gate circuit 74 may receive the first result-bits FOB_0 through FOB_7, and may perform an OR-operation between the first result-bits FOB_0 through FOB_7 to output the second result-bit SOB. Here, when the second result-bit SOB has a binary number '1', the method of FIG. 5 may determine that each gamma-offset is incorrectly written in the MTP memory device 72 for the pixel circuit. On the other hand, when the second result-bit SOB has a binary number '0', the method of FIG. 5 may determine that each gamma-offset is correctly written in the MTP memory device 72 for the pixel circuit. However, since a structure of FIG. 7 is exemplary, a way of performing a logical operation between each bit R255_D0 through R255_D7 of each gamma-offset written in the MTP buffer device 71 and each bit ADDRESSN_R255_D0 through ADDRESSN_R255_D7 of each gamma-offset written in the MTP memory device 72 is not limited thereto. As described above, when the MTP operation is performed on the pixel circuit, the method of FIG. 5 may accurately detect whether or not each gamma-offset is correctly written in the MTP memory device 72 based on a logical operation between each bit R255_D0 through R255_D7 of each gamma-offset written in the MTP buffer device 71 and each bit ADDRESSN_R255_D0 through ADDRESSN_R255_D7 of each gamma-offset written in the MTP memory device 72.

Figure 8:
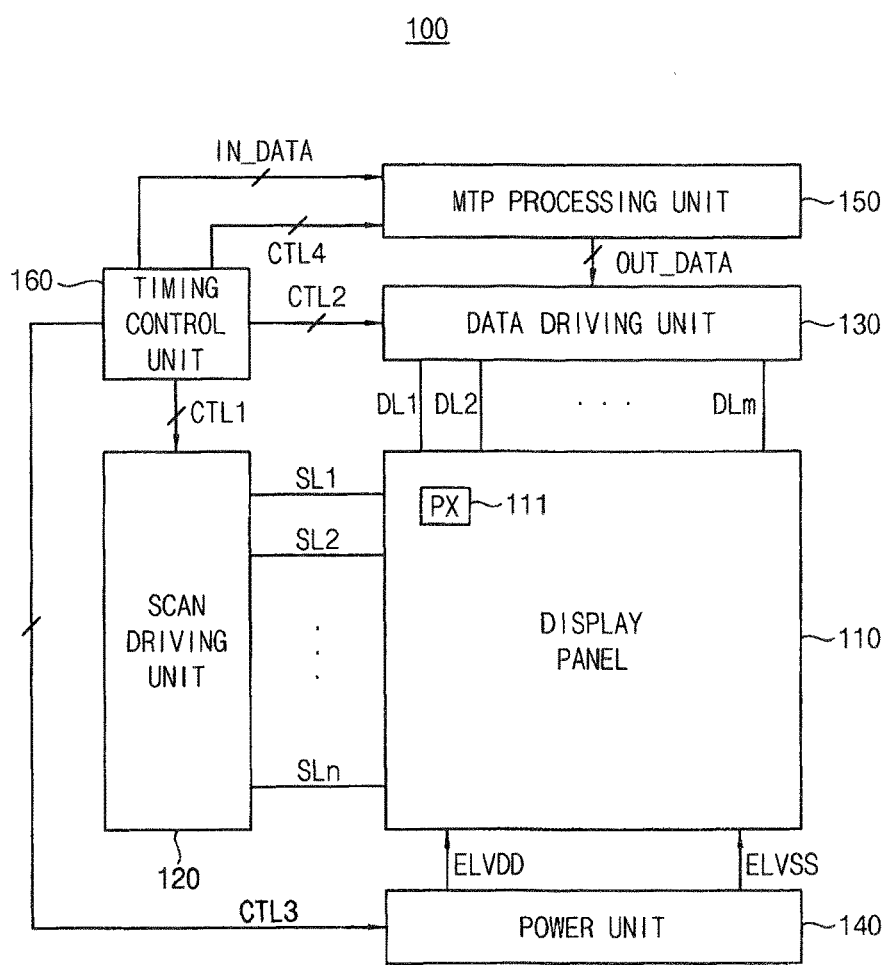
FIG. 8 is a block diagram illustrating an organic light emitting display device according to example embodiments.
Figure 9:
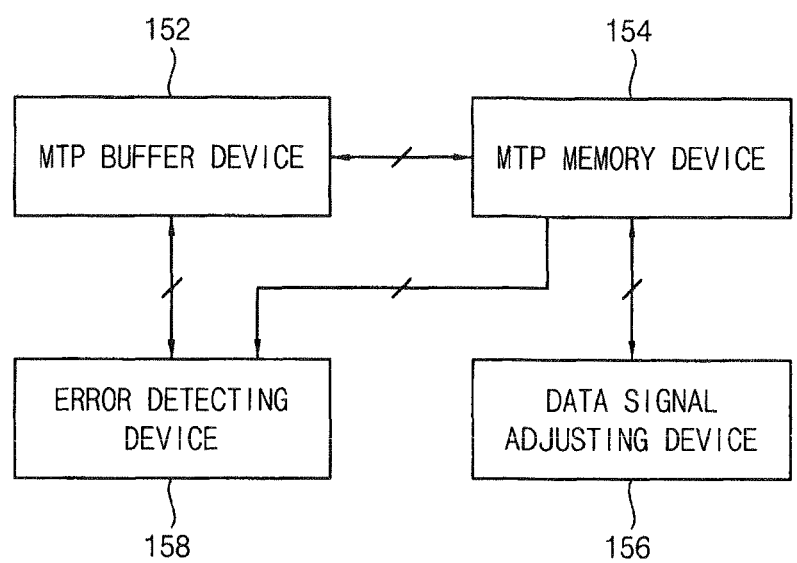
FIG. 9 is a block diagram illustrating an MTP processing unit included in an organic light emitting display device of FIG. 8.

FIG. 8 is a block diagram illustrating an organic light emitting display device according to example embodiments. FIG. 9 is a block diagram illustrating an MTP processing unit included in an organic light emitting display device of FIG. 8.

Referring to FIGS. 8 and 9, the organic light emitting display device 100 may include a display panel 110, a scan driving unit (aka scan driver) 120, a data driving unit (aka data driver) 130, a power unit (aka power supplier) 140, an MTP processing unit (aka MTP processor) 150, and a timing control unit (aka timing controller) 160. For example, the organic light emitting display device 100 may employ a sequential emission driving technique.

The display panel 110 may include pixel (PX) circuits 111. The display panel 110 may be coupled to the scan driving unit 120 via scan-lines SL1 through SLn, and may be coupled to the data driving unit 130 via data-lines DL1 through DLm. Here, the display panel 110 may include n*m pixel circuits 111 because the pixel circuits 111 are arranged at locations corresponding to crossing points of the scan-lines SL1 through SLn and the data-lines DL1 through DLm. In one example embodiment, the pixel circuits 111 may include red color pixel circuits, green color pixel circuits, and blue color pixel circuits. In another example embodiment, the pixel circuits 111 may include red color pixel circuits, green color pixel circuits, blue color pixel circuits, and white color pixel circuits. The scan driving unit 120 may provide a scan signal to the pixel circuits 111 via the scan-lines SL1 through SLn. The data driving unit 130 may provide a data signal to the pixel circuits 111 via the data-lines DL1 through DLm. The power unit 140 may provide a high power voltage ELVDD and a low power voltage ELVSS to the pixel circuits 111 via power-lines.

The MTP processing unit 150 may adjust the data signal based on gamma-offsets for the pixel circuits 111, where the gamma-offsets are generated by performing an MTP operation at predetermined reference gray-levels for the pixel circuits 111. In addition, the MTP processing unit 150 may accurately detect an error of the MTP operation based on the gamma-offsets and/or header-bits indicating whether or not the gamma-offsets are written. Specifically, the MTP processing unit 150 may accurately detect whether or not the MTP operation is performed on the pixel circuit 111 based on a logical operation between the header-bits read from the MTP memory device 154, and may accurately detect whether or not the gamma-offsets are correctly written in the MTP memory device 154 for the pixel circuits 111 based on a logical operation between each bit of gamma-offsets written in an MTP buffer device 152 and each bit of finally updated gamma-offsets written in the MTP memory device 154. Since this operation is described above with reference to FIGS. 1 through 7, the duplicated descriptions will not be repeated. In one example embodiment, as illustrated in FIG. 8, the MTP processing unit 150 may be located outside the timing control unit 160 and the data driving unit 130. In another example embodiment, the MTP processing unit 150 may be located inside the timing control unit 160, or inside the data driving unit 130.

As described above, the MTP processing unit 150 may adjust the data signal based on the gamma-offsets for the pixel circuits 111, and may detect the error of the MTP operation based on the gamma-offsets and/or the header-bits. For this operation, as illustrated in FIG. 9, the MTP processing unit 150 may include the MTP buffer device 152, the MTP memory device 154, a data signal adjusting device 156, and an error detecting device 158. The MTP buffer device 152 may update the gamma-offsets and the header-bits while the MTP operation is performed on the pixel circuits 111. The MTP memory device may store finally updated gamma-offsets and finally updated header-bits when the MTP operation is finished on the pixel circuits 111. The data signal adjusting device 156 may adjust the data signal (i.e., convert an input data signal IN_DATA into an output data signal OUT_DATA) based on the finally updated gamma-offsets that are stored in the MTP memory device 154. The error detecting device 158 may detect the error of the MTP operation based on at least one of the gamma-offsets, the finally updated gamma-offsets, the header-bits, and/or the finally updated header-bits. The timing control unit 160 may control the scan driving unit 120, the data driving unit 130, the power unit 140, and the MTP processing unit 150 based on first through fourth control signals CTL1, CTL2, CTL3, and CTL4.

In conclusion, the organic light emitting display device 100 may accurately detect whether the MTP operation has been performed on the pixel circuit 111 based on a logical operation between the header-bits read from the MTP memory device 154 when the MTP operation is finished on the pixel circuit 111, and may accurately detect whether the gamma-offsets are correctly written in the MTP memory device 154 for the pixel circuit 111 based on a logical operation between each bit of the gamma-offsets written in the MTP buffer device 152 and each bit of the finally updated gamma-offsets written in the MTP memory device 154. Thus, an occurrence that a non-defective product is determined as a defective product, or an occurrence that a defective product is determined as a non-defective product may be prevented (i.e., reduced).

Figure 10:
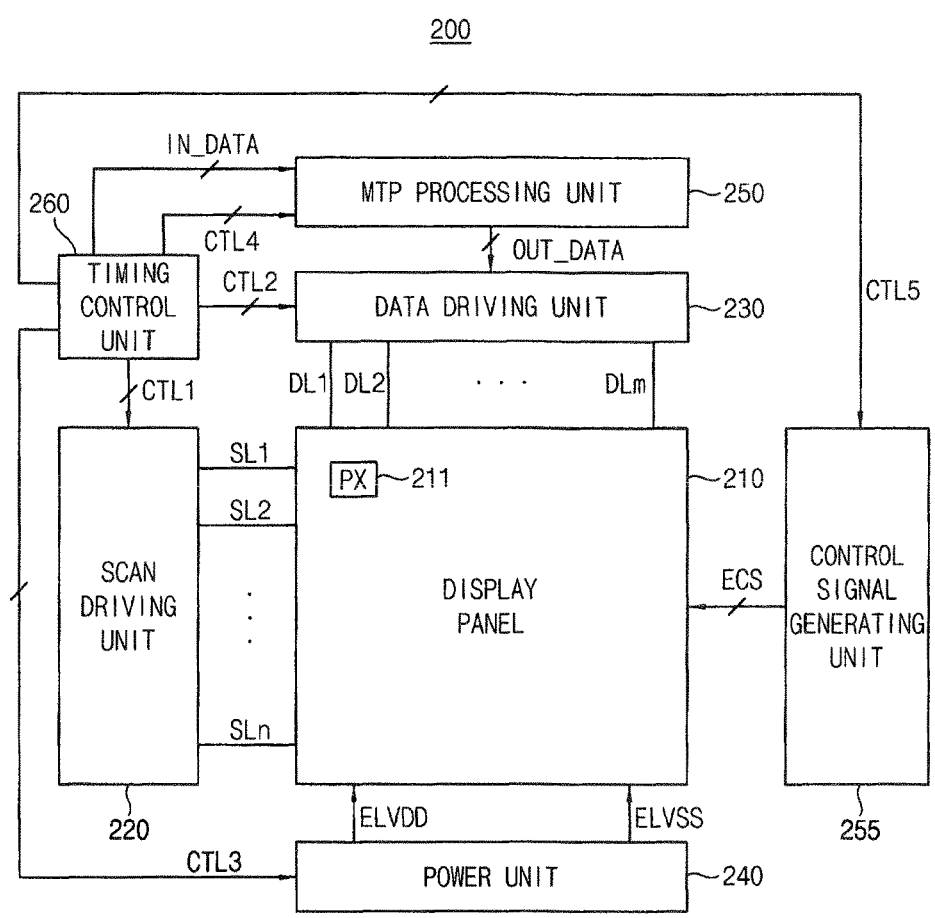
FIG. 10 is a block diagram illustrating an organic light emitting display device according to example embodiments.

FIG. 10 is a block diagram illustrating an organic light emitting display device according to example embodiments.

Referring to FIG. 10, the organic light emitting display device 200 may include a display panel 210, a scan driving unit (aka scan driver) 220, a data driving unit (aka data driver) 230, a power unit (aka power supplier) 240, an MTP processing unit (aka MTP processor) 250, a control signal generating unit (aka control signal generator) 255, and a timing (aka timing controller) 260. For example, the organic light emitting display device 200 may employ a simultaneous emission driving technique.

The display panel 210 may include pixel circuits 211. The display panel 210 may be coupled to the scan driving unit 220 via scan-lines SL1 through SLn, and may be coupled to the data driving unit 230 via data-lines DL1 through DLm. In one example embodiment, the pixel circuits 211 may include red color pixel circuits, green color pixel circuits, and blue color pixel circuits. In another example embodiment, the pixel circuits 211 may include red color pixel circuits, green color pixel circuits, blue color pixel circuits, and white color pixel circuits. The scan driving unit 220 may provide a scan signal to the pixel circuits 211 via the scan-lines SL1 through SLn. The data driving unit 230 may provide a data signal to the pixel circuits 211 via the data-lines DL1 through DLm. The power unit 240 may provide a high power voltage ELVDD and a low power voltage ELVSS to the pixel circuits 211 via power-lines. The MTP processing unit 250 may adjust the data signal based on gamma-offsets for the pixel circuits 211, where the gamma-offsets are generated by performing an MTP operation at predetermined reference gray-levels for the pixel circuits 211. In addition, the MTP processing unit 250 may accurately detect an error of the MTP operation based on the gamma-offsets and/or header-bits indicating whether or not the gamma-offsets are written. In one example embodiment, as illustrated in FIG. 10, the MTP processing unit 250 may be located outside the timing control unit 260 and the data driving unit 230. In another example embodiment, the MTP processing unit 250 may be located inside the timing control unit 260, or inside the data driving unit 230. The control signal generating unit 255 may provide an emission control signal ECS to the display panel 210, where the emission control signal ECS controls the pixel circuits 211 of the display panel 210 to simultaneously emit light. The timing control unit 260 may control the scan driving unit 220, the data driving unit 230, the power unit 240, the MTP processing unit 250, and the control signal generating unit 255 based on first through fifth control signals CTL1, CTL2, CTL3, CTL4, and CTL5. In conclusion, the organic light emitting display device 200 may accurately detect whether or not the MTP operation is performed on the pixel circuit 211 based on a logical operation between the header-bits read from the MTP memory device when the MTP operation is finished on the pixel circuit 211, and may accurately detect whether or not the gamma-offsets are correctly written in the MTP memory device for the pixel circuit 211 based on a logical operation between each bit of the gamma-offsets written in an MTP buffer device and each bit of the finally updated gamma-offsets written in the MTP memory device. Thus, an occurrence that a non-defective product is determined as a defective product, or an occurrence that a defective product is determined as a non-defective product may be prevented (i.e., reduced).

Figure 11:
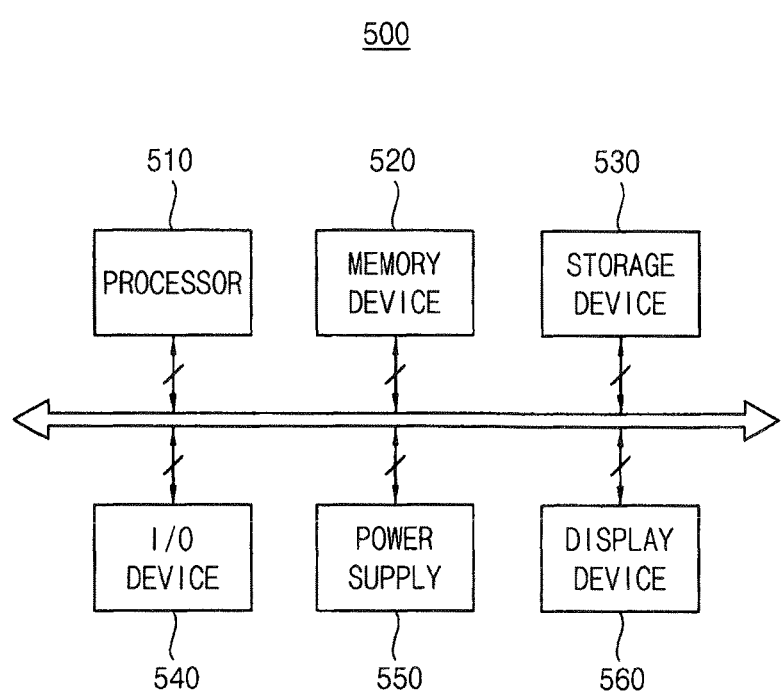
FIG. 11 is a block diagram illustrating an electronic device having an organic light emitting display device according to example embodiments.
Figure 12:
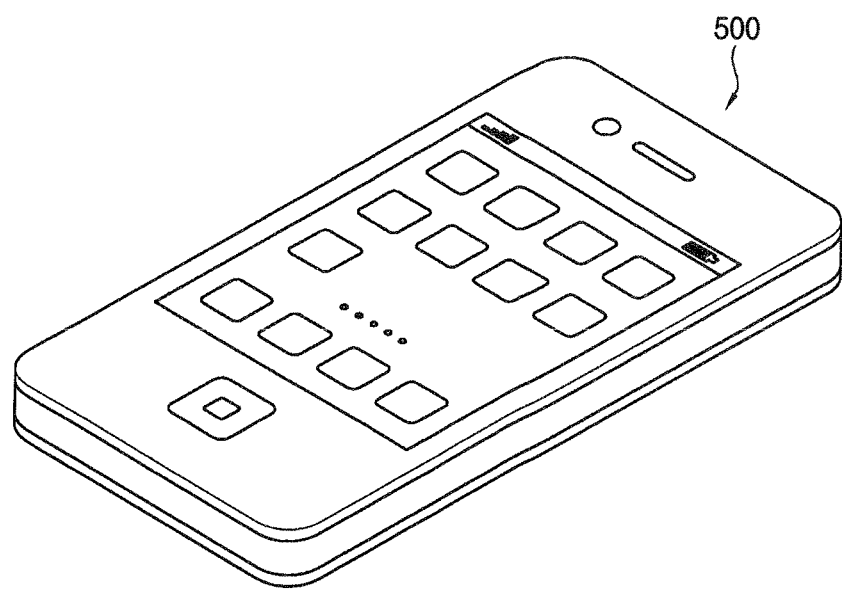
FIG. 12 is a diagram illustrating an example in which an electronic device of FIG. 11 is implemented as a smartphone.

FIG. 11 is a block diagram illustrating an electronic device having an organic light emitting display device according to example embodiments. FIG. 12 is a diagram illustrating an example in which an electronic device of FIG. 11 is implemented as a smart-phone.

Referring to FIGS. 11 and 12, the electronic device 500 may include a processor 510, a memory device 520, a storage device 530, an input/output (I/O) device 540, a power supply 550, and an organic light emitting display device 560. Here, the organic light emitting display device 560 may correspond to the organic light emitting display device 100 of FIG. 8, or the organic light emitting display device 200 of FIG. 10. In addition, the electronic device 500 may further include a plurality of ports for communicating a video card, a sound card, a memory card, a universal serial bus (USB) device, other electronic devices, etc. In one example embodiment, as illustrated in FIG. 12, the electronic device 500 may be implemented as the smart-phone. However, an implementation of the electronic device 500 is not limited thereto.

The processor 510 may perform various computing functions. The processor 510 may be a micro processor, a central processing unit (CPU), etc. The processor 510 may be coupled to other components via an address bus, a control bus, a data bus, etc. Further, the processor 510 may be coupled to an extended bus such as a peripheral component interconnection (PCI) bus. The memory device 520 may store data for operations of the electronic device 500. For example, the memory device 520 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile DRAM device, etc. The storage device 530 may be a solid state drive (SSD) device, a hard disk drive (HDD) device, a CD-ROM device, etc.

The I/O device 540 may be an input device such as a keyboard, a keypad, a touchpad, a touch-screen, a mouse, etc, and an output device such as a printer, a speaker, etc. In some example embodiments, the organic light emitting display device 560 may be included in the I/O device 540. The power supply 550 may provide a power for operations of the electronic device 500. The organic light emitting display device 560 may communicate with other components via the buses or other communication links. In one example embodiment, the organic light emitting display device 560 may include a display panel, a scan driving unit, a data driving unit, a power unit, an MTP processing unit, and a timing control unit. In another example embodiment, the organic light emitting display device 560 may include a display panel, a scan driving unit, a data driving unit, a power unit, an MTP processing unit, a control signal generating unit, and a timing control unit. Here, the MTP processing unit may adjust a data signal based on gamma-offsets for pixel circuits, where the gamma-offsets are generated by performing an MTP operation at predetermined reference gray-levels for the pixel circuits. In addition, the MTP processing unit may accurately detect an error of the MTP operation based on the gamma-offsets and/or header-bits indicating whether on not the gamma-offsets are written. Although it is described above that the present inventive concept is applied to the organic light emitting display device, the present inventive concept may also be applied to a liquid crystal display (LCD) device.

The present inventive concept may be applied to an electronic device having a display device. For example, the present inventive concept may be applied to a television, a computer monitor, a laptop, a digital camera, a cellular phone, a smart phone, a smart pad, a personal digital assistant (PDA), a portable multimedia player (PMP), a MP3 player, a navigation system, a game console, a video phone, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of detecting an error of a multi-time programmable (MTP) operation in an organic light emitting display device having a plurality of pixel circuits, the method comprising:
    performing the MTP operation correcting luminance and color coordinate of the plurality of pixel circuits of the organic light emitting display device to adjust an image quality of the organic light emitting display device to reach a target quality level;
    writing each gamma-offset and each header-bit at predetermined reference gray-levels in an MTP memory device while the MTP operation is being performed on the pixel circuits, each header-bit indicating whether each gamma-offset is written in the MTP memory device; and
    detecting whether the MTP operation has been performed on the pixel circuits based on a logical operation between the header-bits at the predetermined reference gray-levels read from the MTP memory device,
    wherein an AND-gate circuit outputs a result-bit by performing an AND-operation between the header-bits read from the MTP memory device,
    wherein a detecting result is that the MTP operation is performed on the pixel circuit when the result-bit has the binary number '1', and
    wherein the detecting result is that the MTP operation is not performed when the result-bit has the binary number '0'.

2. The method of claim 1, wherein the pixel circuit includes a red color pixel circuit, a green color pixel circuit, and a blue color pixel circuit.

3. The method of claim 2, wherein the pixel circuit further includes a white color pixel circuit.

4. The method of claim 1, wherein writing each gamma-offset and each header-bit at the predetermined reference gray-levels in the MTP memory device includes:
    setting each header-bit to have a first logic level when each gamma-offset is written in the MTP memory device; and
    setting each header-bit to have a second logic level when each gamma-offset is not written in the MTP memory device.

5. The method of claim 4, wherein the detecting whether the MTP operation has been performed on the pixel circuit includes:
    determining that the MTP operation has not been performed when at least one of the header-bits read from the MTP memory device has the second logic level; and
    determining that the MTP operation has been performed when all of the header-bits read from the MTP memory device have the first logic level.

6. The method of claim 5, wherein the first logic level corresponds to a binary number '1', and the second logic level corresponds to a binary number '0'.

7. A method of detecting an error of a multi-time programmable (MTP) operation in an organic light emitting display device that includes a plurality of pixel circuits, the method comprising:
    performing the MTP operation to correct luminance and color coordinate of the plurality of pixel circuits of the organic light emitting display device;
    updating each gamma-offset and each header-bit at predetermined reference gray-levels in an MTP buffer device while the MTP operation is being performed on the pixel circuits, each header-bit indicating whether each gamma-offset is written in the MTP buffer device;
    writing each finally updated gamma-offset and each finally updated header-bit at the predetermined reference gray-levels in an MTP memory device; and
    detecting whether each gamma-offset has been correctly written to the MTP memory device based on a logical operation between each bit of each gamma-offset written in the MTP buffer device and each bit of each finally updated gamma-offset written in the MTP memory device.

8. The method of claim 7, wherein each of the pixel circuits include a red color pixel circuit, a green color pixel circuit, and a blue color pixel circuit.

9. The method of claim 8, wherein each of the pixel circuits further includes a white color pixel circuit.

10. The method of claim 7, wherein the detecting whether each gamma-offset has been correctly written in the MTP memory device includes:
    determining that each gamma-offset has been correctly written in the MTP memory device when each bit of each gamma-offset written in the MTP buffer device is identical to each bit of each finally updated gamma-offset written in the MTP memory device; and
    determining that each gamma-offset has been incorrectly written in the MTP memory device when each bit of each gamma-offset written in the MTP buffer device is not identical to each bit of each finally updated gamma-offset written in the MTP memory device.

11. A method of detecting an error of a multi-time programmable (MTP) operation on an organic light emitting display device, the method comprising:
    updating each gamma-offset and each header-bit at predetermined reference gray-levels in a MTP buffer device while the MTP operation is being performed on a pixel circuit, each header-bit indicating whether each gamma-offset has been written to the MTP buffer device;
    writing each finally updated gamma-offset and each finally updated header-bit at the predetermined reference gray-levels to an MTP memory device; and
    detecting whether each gamma-offset has been correctly written to the MTP memory device based on a logical operation between each bit of each gamma-offset written in the MTP buffer device and each bit of each finally updated gamma-offset written in the MTP memory device, wherein the detecting includes:
    determining each bit of each gamma-offset written in the MTP buffer device is identical to each bit of each finally updated gamma-offset written in the MTP memory device; and determining each bit of each gamma-offset written in the MTP buffer device is not identical to each bit of each finally updated gamma-offset written in the MTP memory device, wherein XOR-gate circuits output first result-bits by performing an XOR-operation between each bit of each gamma-offset written in the MTP buffer device and each bit of each finally updated gamma-offset written in the MTP memory device, and an OR-gate circuit outputs a second result-bit by performing an OR-operation between the first result-bits, wherein a detecting result is that each gamma-offset has been incorrectly written in the MTP memory device when the second result-bit has a binary number '1', and wherein the detecting result is that each gamma-offset has been correctly written in the MTP memory device when the second result-bit has a binary number '0'.

12. An organic light emitting display device, comprising:
a display panel having a plurality of pixel circuits;
a scan driver to provide a scan signal to the pixel circuits;
a data driver to provide a data signal to the pixel circuits;
a power supplier to provide a high power voltage and a low power voltage to the pixel circuits;
a multi-time programmable (MTP) processor to correct luminance and color coordinate of the plurality of pixel circuits of the display panel of the organic light emitting display device by adjusting the data signal based on gamma-offsets for the pixel circuits, where the gamma-offsets are generated by performing an MTP operation at predetermined reference gray-levels for the pixel circuits, the MTP processor to also detect an error of the MTP operation based on examining header-bits indicating whether the gamma-offsets have been written to an MTP memory device at a conclusion of the MTP operation; and
a timing controller to control the scan driver, the data driver, the power supplier, and the MTP processor.

13. The device of claim 12, wherein the MTP processor is located within the data driver or within the timing controller.

14. The device of claim 12, wherein the pixel circuits include red color pixel circuits, green color pixel circuits, and blue color pixel circuits.

15. The device of claim 14, wherein the pixel circuits further include white color pixel circuits.

16. The device of claim 12, wherein the MTP processor includes:
an MTP buffer device configured to update the gamma-offsets and the header-bits while the MTP operation is being performed on the pixel circuits;
the MTP memory device configured to receive finally updated gamma-offsets and finally updated header-bits from the MTP buffer device, and to store the finally updated gamma-offsets and the finally updated header-bits;
a data signal adjusting device configured to adjust the data signal based on the finally updated gamma-offsets that are stored in the MTP memory device; and
an error detecting device configured to detect the error of the MTP operation based on at least one of the gamma-offsets, the finally updated gamma-offsets, the header-bits, and the finally updated header-bits.

17. The device of claim 16, wherein the header-bits are set to have a first logic level when the gamma-offsets have been written in the MTP memory device, and the header-bits are set to have a second logic level when the gamma-offsets have not been written in the MTP memory device.

18. The device of claim 17, wherein the error detecting device determines that the MTP operation has not been performed when at least one of the header-bits read from the MTP memory device has the second logic level; and
wherein the error detecting device determines that the MTP operation has been performed when all of the header-bits read from the MTP memory device has the first logic level.

19. The device of claim 17, wherein the error detecting device determines that the gamma-offsets have been correctly written in the MTP memory device when each bit of the gamma-offsets written in the MTP buffer device is identical to each bit of the finally updated gamma-offsets written in the MTP memory device; and
wherein the error detecting device determines that the gamma-offsets have been incorrectly written in the MTP memory device when each bit of the gamma-offsets written in the MTP buffer device is not identical to each bit of the finally updated gamma-offsets written in the MTP memory device.

* * * * *